(12) United States Patent
Bronson et al.

(10) Patent No.: US 7,665,306 B2
(45) Date of Patent: Feb. 23, 2010

(54) HEAT SHIELDS FOR USE IN COMBUSTORS

(75) Inventors: Thomas J. Bronson, Mesa, AZ (US); Rodolphe Dudebout, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 156 days.

(21) Appl. No.: 11/767,306

(22) Filed: Jun. 22, 2007

(65) Prior Publication Data

US 2008/0314044 A1    Dec. 25, 2008

(51) Int. Cl.
  *F02C 1/00*    (2006.01)
(52) U.S. Cl. .......................................... 60/752; 60/754
(58) Field of Classification Search .......... 60/752–760, 60/800, 804–806, 743, 746, 796
See application file for complete search history.

(56) References Cited

U.S. PATENT DOCUMENTS

| | | | |
|---|---|---|---|
| 4,000,612 A | 1/1977 | Wakeman et al. | |
| 5,129,231 A | 7/1992 | Becker et al. | |
| 5,271,219 A | 12/1993 | Richardson | |
| 5,396,759 A | 3/1995 | Richardson | |
| 5,419,115 A | 5/1995 | Butler et al. | |
| 5,490,389 A | 2/1996 | Harrison et al. | |
| 5,918,467 A | 7/1999 | Kwan | |
| 5,956,955 A | 9/1999 | Schmid | |
| 6,408,628 B1 | 6/2002 | Pidcock et al. | |
| 6,497,105 B1 * | 12/2002 | Stastny | 60/796 |
| 6,546,733 B2 * | 4/2003 | North et al. | 60/772 |
| 6,751,961 B2 * | 6/2004 | Pacheco-Tougas et al. | 60/752 |
| 6,792,757 B2 * | 9/2004 | Borns et al. | 60/772 |
| 6,978,618 B2 | 12/2005 | Pacheco-Tougas et al. | |
| 7,093,439 B2 | 8/2006 | Pacheco-Tougas et al. | |
| 2008/0066468 A1 * | 3/2008 | Faulder et al. | 60/737 |

FOREIGN PATENT DOCUMENTS

EP    0471437 A1    2/1992

OTHER PUBLICATIONS

UK Intellectual Property Office, Examiner Brian A. Woods, "Patents Act 1977: Search Report Under Section 17," Jun. 9, 2008.

* cited by examiner

Primary Examiner—Michael Cuff
Assistant Examiner—Phutthiwat Wongwian
(74) Attorney, Agent, or Firm—Ingrassia Fisher & Lorenz, P.C.

(57) ABSTRACT

A combustor includes an inner liner; an outer liner circumscribing the inner liner and forming a combustion chamber with the inner liner; a combustor dome coupled to the inner and outer liners; and a plurality of heat shields coupled to combustor dome. Each of the heat shields includes a heat shield plate defined by a first edge facing the inner liner and a second edge facing the outer liner; and a plurality of baffles extending from the heat shield plate. Each of the plurality of baffles includes two ribs and a connection portion connecting the two ribs to form a closed portion and an opposite open portion. The open portion of each of the plurality of baffles faces the first edge or the second edge.

16 Claims, 6 Drawing Sheets

HEAT SHIELDS FOR USE IN COMBUSTORS

STATEMENT REGARDING FEDERALLY SPONSORED RESEARCH OR DEVELOPMENT

This invention was made with Government support under contract number F33615-03-D-2355-D006 of the Versatile Affordable Advanced Turbine Engine (VAATE) program. The Government has certain rights in this invention.

TECHNICAL FIELD

The present invention generally relates to heat shields for use in combustors, and more particularly relates to heat shields having baffles for more effective cooling and for use in combustors.

BACKGROUND

Combustor heat shields have been used in the combustors of gas turbine engines. These heat shields are positioned between the combustor dome and the combustion chamber and are used to shield the combustor dome from the heat generated by ignited gases within the combustion chamber. Impingement openings in the combustor dome allow air to pass through the dome. The air then contacts the upstream surface of the heat shield to cool the heat shield by impingement and convection heat transfer. However, the air may not adequately cool the heat shield.

An increase in the effectiveness of cooling results in increased durability for the heat shields, and thus, reduces replacement frequency. One mechanism for increasing the effectiveness of heat shield cooling includes increasing the volume of air that passes through the impingement openings of the combustor dome. The increased air volume may increase heat shield cooling, but the quantity of cooling air available to the heat shield is generally restricted by the demand to cool other areas of the combustor and turbine engine.

Accordingly, it is desirable to provide heat shields for use in combustors that provide more effective cooling. In addition, it is desirable to provide combustors that exhibit increased cooling effectiveness. Furthermore, other desirable features and characteristics of the present invention will become apparent from the subsequent detailed description of the invention and the appended claims, taken in conjunction with the accompanying drawings and this background of the invention.

BRIEF SUMMARY

In one exemplary embodiment, a combustor includes an inner liner; an outer liner circumscribing the inner liner and forming a combustion chamber with the inner liner; a combustor dome coupled to the inner and outer liners; and a plurality of heat shields coupled to combustor dome. Each of the heat shields includes a heat shield plate defined by a first edge facing the inner liner and a second edge facing the outer liner; and a plurality of baffles extending from the heat shield plate. Each of the plurality of baffles includes two ribs and a connection portion connecting the two ribs to form a closed portion and an opposite open portion. The open portion of each of the plurality of baffles faces the first edge or the second edge.

In another exemplary embodiment, a heat shield for use in a combustor includes a heat shield plate defined by a first edge, a second edge and two side edges; and a plurality of baffles extending from the heat shield plate. Each of the plurality of baffles includes two ribs and a connection portion connecting the two ribs to form a closed portion and an opposite open portion. Each of the open portions faces the first or second edge.

In yet another exemplary embodiment, a heat shield to be positioned downstream of a combustor dome in an annular combustor includes an upstream surface facing the combustor dome. The upstream surface is defined by an inner edge, an outer edge and two side edges. The heat shield further includes a plurality of baffles extending from the upstream surface. Each of the plurality of baffles includes two ribs and a connection portion connecting the two ribs. Each of the plurality of baffles has an open portion opposite the connection portion and facing the inner or outer edge.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the application and uses. Furthermore, there is no intention to be bound by any theory presented in the preceding background the invention or the following detailed description.

Figure 1:
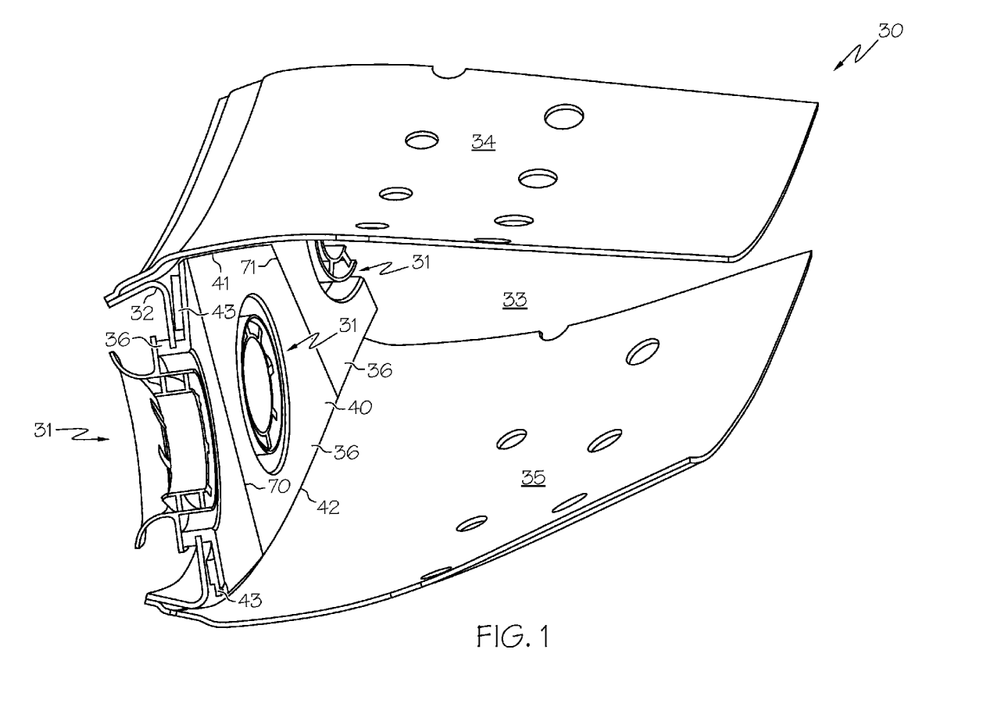
FIG. 1 is a partial three-dimensional, cross-sectional view of a combustor according to an exemplary embodiment.

FIG. 1 is a partial three-dimensional, cross-sectional view of a combustor 30 according to an exemplary embodiment. The combustor 30 comprises an outer combustor liner 35 and an inner combustor liner 34. The outer combustor liner 35 circumscribes the inner combustor liner 34 to form a combustion chamber 33 therebetween. A combustor dome 32 extends between the inner combustor liner 34 and the outer combustor liner 35. A plurality of swirlers 31 are coupled to the combustor dome 32, and a plurality of heat shields 36 are positioned on the combustor dome 32 and around the swirler 31. In one exemplary embodiment, sixteen heat shields 36 and sixteen swirlers 31 are provided.

Figure 2:
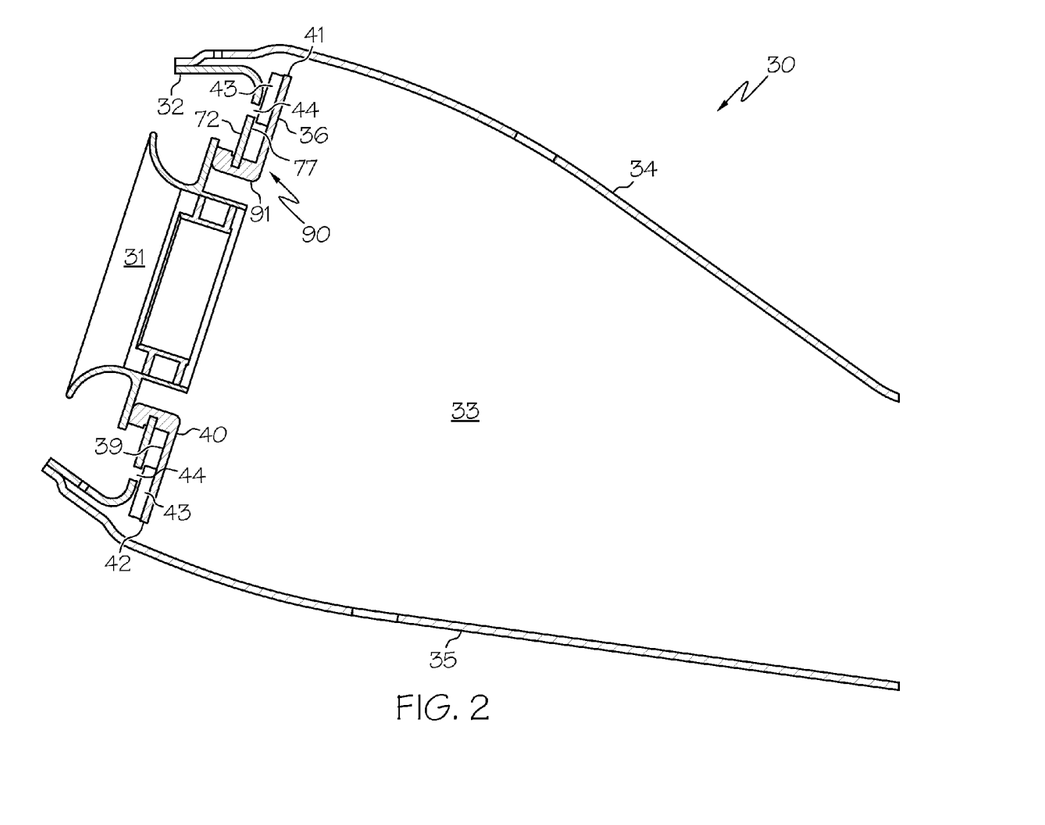
FIG. 2 is a cross-sectional view of the combustor illustrated in FIG. 1.

Reference is made to FIGS. 1 and 2, which shows another cross-sectional view of the combustor 30 of FIG. 1. Each heat shield 36 is positioned on the combustor dome 32 and includes a heat shield plate 90 with an upstream surface 39, a downstream surface 40, an inner edge 41, an outer edge 42 and two side edges 70, 71. The heat shield plate 90 has an annular opening 91 to accommodate the swirler 31. As best shown in FIG. 2 and discussed in further detail below, the heat shield 36 further comprises baffles 43 positioned on the upstream surface 39 of the heat shield plate 90. The combustor dome 32 defines a plurality of impingement openings 44 extending through the combustor dome 32. The heat shields 36 may be secured such that the baffles 43 remain fixed relative to the impingement openings 44. The heat shields 36 can be secured within the combustor 30 by any conventional means.

During engine operation, a compressor (not shown) is used to pressurize a volume of air. A first portion of the air passes through the swirler 31 and is mixed with fuel from the fuel nozzle (not shown) in the combustion chamber 33 where it is ignited by an igniter (not shown). A second portion of the air may pass through the impingement openings 44 and onto the heat shields 36 in order to cool the heat shields 36. As discussed in further detail below, the baffles 43 direct the air towards the inner and outer edges 41, 42 of the heat shields 36. The air may then exit the heat shields 36 and form a cooling air film on the exposed surface of the combustor dome 32 and/or the inner and outer combustor liners 34, 35.

Figure 3:
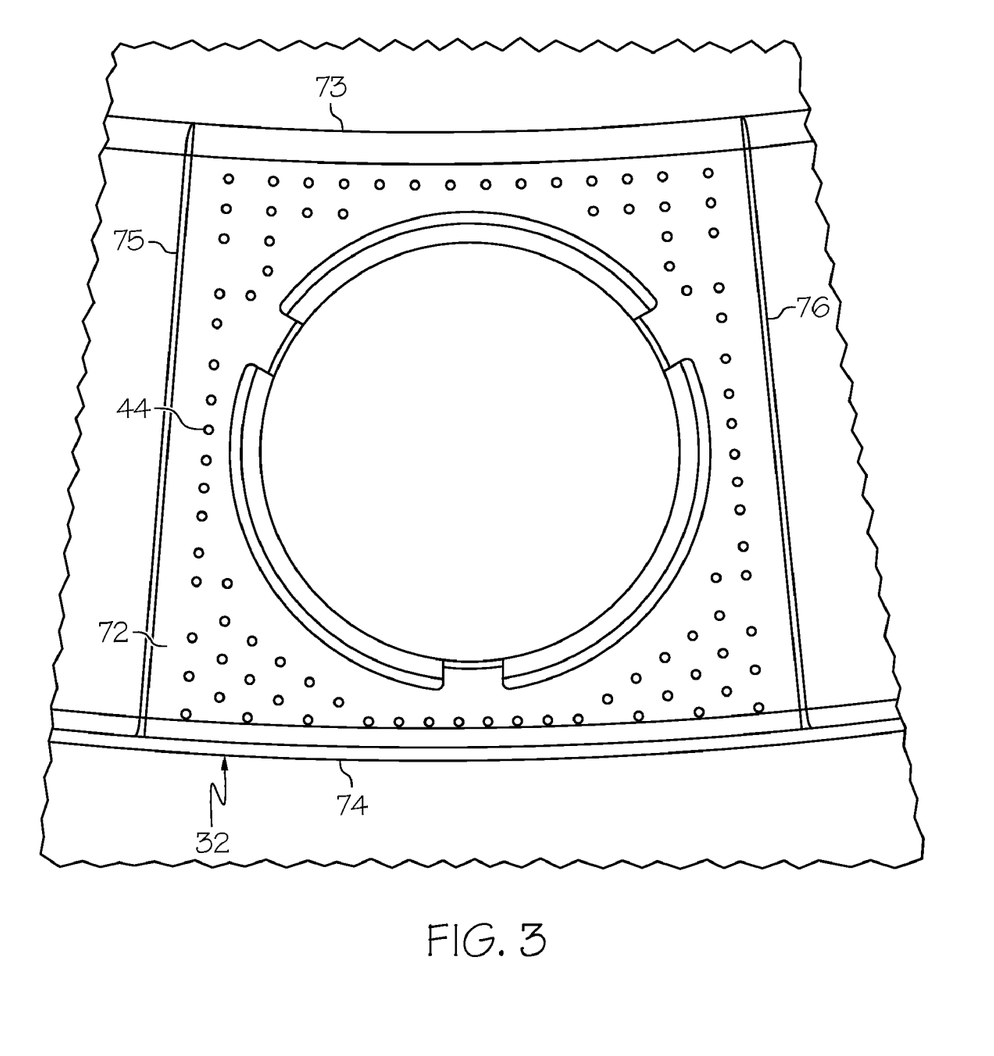
FIG. 3 is a view of a portion of an upstream surface of a combustor dome utilized in the combustor of FIG. 1 in accordance with an exemplary embodiment.

FIG. 3 is a view of a portion of an upstream surface 72 of the combustor dome 32 in accordance with an exemplary embodiment of the present invention, and better illustrates the plurality of impingement openings 44 that extend from the upstream surface 72 through the combustor dome 32 to a downstream surface 77 (FIG. 2). The illustrated portion of the combustor dome 32 is defined by a first edge 73, a second edge 74, and two side edges 75, 76. In one embodiment, the first edge 73 can be an inner edge, and the second edge 74 can be an outer edge. The impingement openings 44 are arranged in rows that are generally aligned in a lateral direction, i.e., from side edge 75 to side edge 76, and extend radially, i.e., from the inner edge 73 to the outer edge 74. In one embodiment, the combustor dome 32 includes about 88 impingement openings 44 per corresponding heat shield 36, with diameters of about 0.023 inches to about 0.035 inches. The diameters of the impingement openings 44 can be the same or different. As noted above, a plurality of the heat shields 36 are positioned on the downstream surface 77 of the combustor dome 32. Generally, one heat shield 36 corresponds to the portion of the combustor dome 32 illustrated in FIG. 3.

Figure 4:
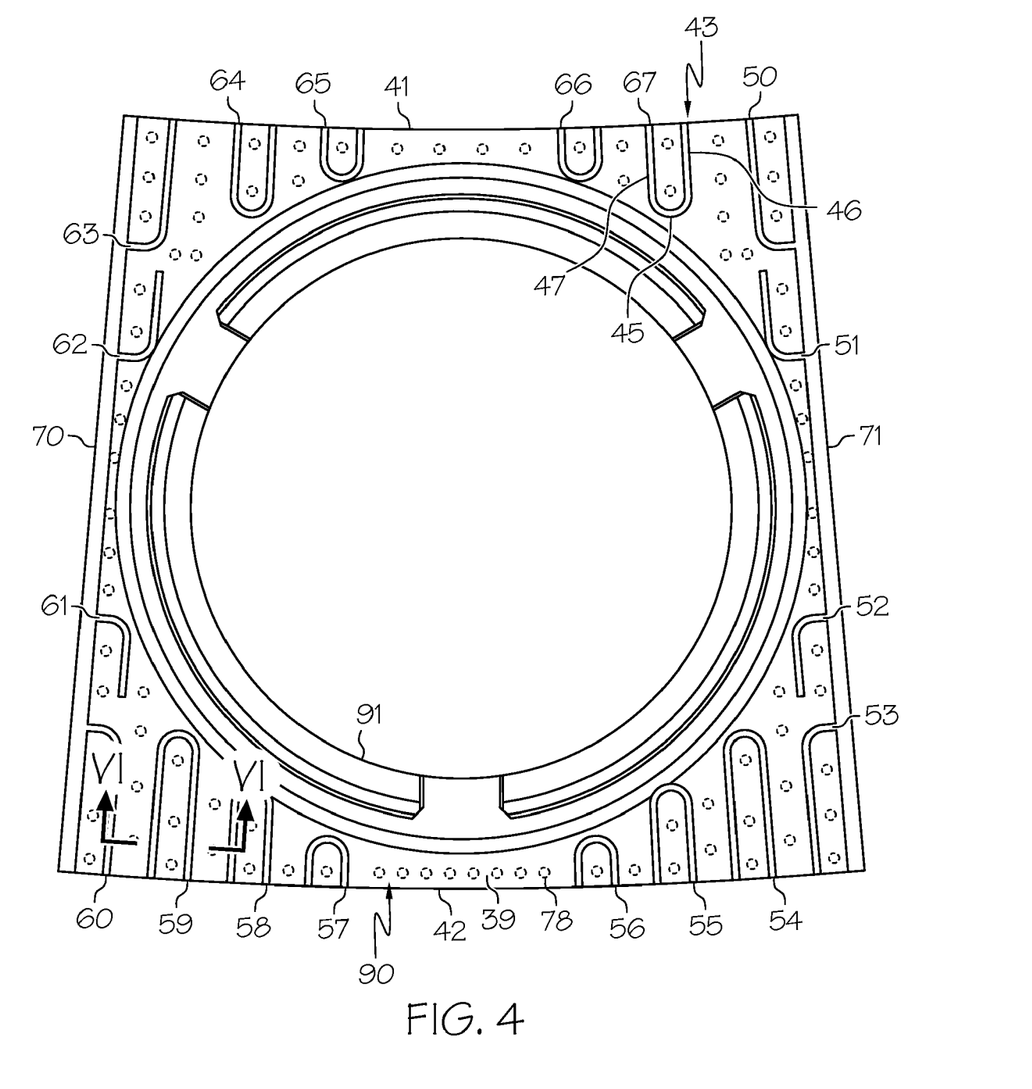
FIG. 4 is a view of an upstream surface of a heat shield utilized in the combustor of FIG. 1 in accordance with an exemplary embodiment.

FIG. 4 is a view of the upstream surface 39 of a heat shield 36 in accordance with an exemplary embodiment of the present invention, which illustrates the baffles 43 in greater detail. To aid in the understanding of this embodiment of the invention, the position of air jets 78 emanating from the impingement openings 44 of the combustor dome 32 relative to the baffles 43 is indicated in FIG. 4. The air jets 78 shown in FIG. 4 generally correspond to the impingement openings 44 in the combustor dome 32 illustrated in FIG. 3.

The heat shield 36 may have a generally trapezoidal shape. In alternate embodiments, the heat shield 36 may have other shapes. Moreover, in this embodiment, the heat shield 36 substantially covers the portion of the combustor dome 32 illustrated in FIG. 3. As such, the plurality of heat shields 36 substantially covers all of the downstream surface 77 of the combustor dome 32. In alternate embodiments, the heat shields 36 cover less than the complete downstream surface 77 of the combustor dome 32.

Figure 6:
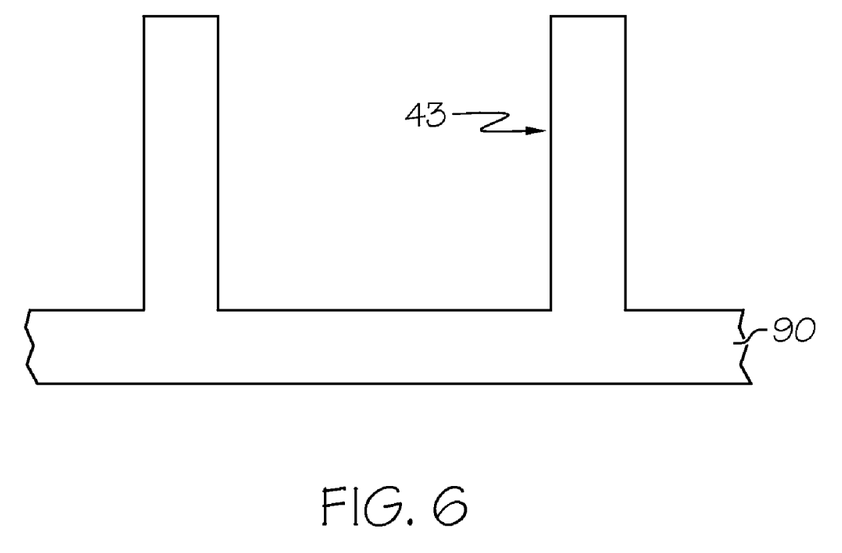
FIG. 6 is a cross-sectional view of a baffle of the heat shield of FIG. 4 through line VI-VI.

The baffles 43 may be U-shaped and may comprise two ribs 46, 47 and a connection portion 45 that connects the two ribs 46, 47. Generally, the baffles 43 can be considered to have a closed portion at the connection portion 45 and an open portion opposite the connection portion 45. In the illustrated embodiment, the connection portion 45 is an arc, although other shapes can be provided. In the exemplary embodiment, the plurality of baffles 43 includes eighteen baffles 50-67, which are referred to herein as the first through eighteenth baffles 50-67. At least some of the baffles 43, such as the first, second, third, fourth, eleventh, twelfth, thirteenth, and fourteenth baffles 50, 51, 52, 53, 60, 61, 62, 63, utilize one of the side edges 70, 71 as a rib. The baffles 43 have a generally constant thickness, as shown in the cross-sectional view of FIG. 6.

The number, geometry, and arrangement of the baffles 43 may be optimized to increase the effectiveness of the air jets 78 to cool the heat shield 36. The arrangement of baffles illustrated in FIG. 4 particularly reduces the amount of cross-flow. Cross-flow is the convergence of the air flows coming from different impingement openings 44. Cross-flow creates disturbance that reduces heat shield 36 cooling efficiency. For example, three air jets 78 impinge the heat shield 36 in the area within the first baffle 50. The first baffle 50 prevents these three air jets 78 from interfering with the air jets 78 outside of the first baffle 50, and the first baffle 50 additionally prevents air jets 78 from outside of the first baffle 50 from interfering with the three air jets 78 within the first baffle 50. Particularly, the first baffle 50 prevents the air jets 78 from interfering with laterally adjacent air jets 78. Similarly, the second through eighteenth baffles 51-67 prevent outside air jets 78 from interfering with the air jets 78 within the respective baffles 51-67, and vice versa. Moreover, the baffles 43 can also cooperate to direct air that impinges outside of the baffles 43. For example, the right rib of the first baffle 50 and the left rib of the eighteenth baffle 67 prevent interference to and from the air jets 78 between the first and eighteenth baffles 50, 67.

In the exemplary illustrated embodiment, one to three air jets 78 are associated with each baffle 43. As an example, the first baffle 50 is associated with three air jets 78, the eighteenth baffle 67 is associated with two air jets 78, and the seventeenth baffle 66 is associated with one air jet 78. A greater or fewer number of air jets 78 can be associated with each baffle 43. In one example, five air jets 78 can be associated with each baffle 43. However, increasing the number of air jets 78 that impinge within a baffle 43 also increases the occurrence of cross-flow between individual air jets 78 associated with the baffle 43. As an example of this consideration, the first and second baffles 50, 51 are separated instead of combined into a single baffle, although the first and second baffles 50, 51 are each associated with air jets 78 within the same row.

Generally, the ribs 46, 47 of the baffles 43 can be parallel to one or more the side edges 70, 71 of the heat shield 36, although not necessarily. The open portions of the baffles 43 face one of the first and second edges 41, 42. In other words, the baffles 43 extend in a radial direction in the annular combustor 30. This arrangement serves to channel air from the air jets 78 to the first and second edges 41, 42 of the heat shield 36, as opposed to the side edges 70, 71 of the heat shield 36. Directing cooling air from the air jets 78 to the inner and outer edges 41, 42 enables the air to provide additional cooling air to the outer and inner combustor liners 34, 35 (FIGS. 1 and 2), and generally provides a more effective use of cooling air. Air emanating from the sides edges 70, 71 of the heat shield 36 would, in effect, be wasted cooling air and possibly interfere with the air jets from adjacent heat shields and/or the combustion processes in the combustion chamber 33.

Figure 5:
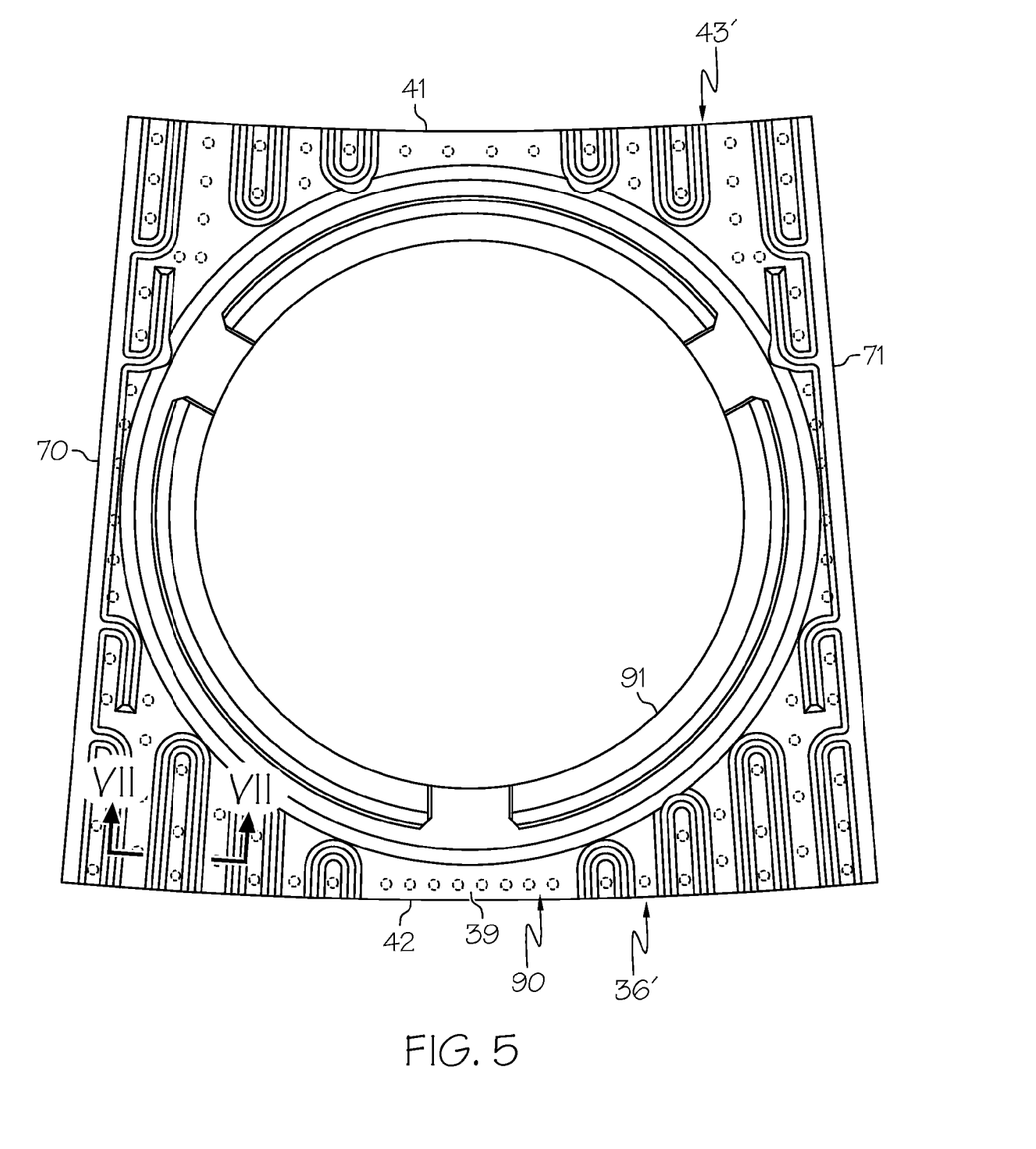
FIG. 5 is a view of an upstream surface of a heat shield utilized in the combustor of FIG. 1 in accordance with an alternate exemplary embodiment.
Figure 7:
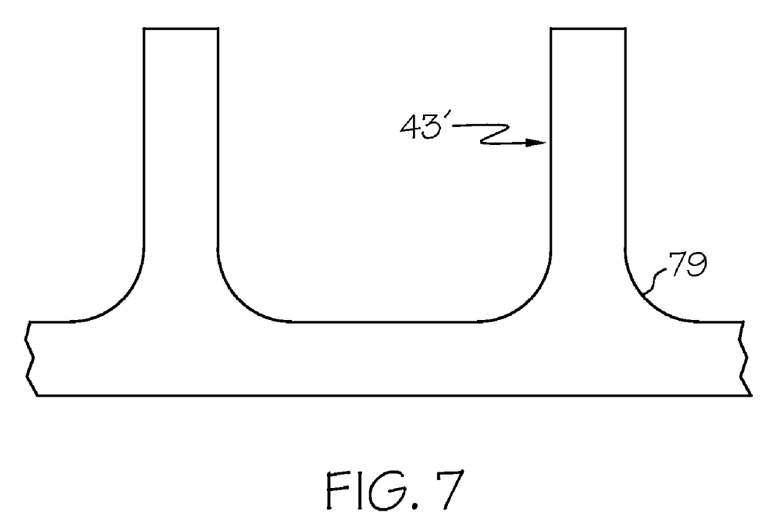
FIG. 7 is a cross-sectional view of a baffle of the heat shield of FIG. 5 through line VII-VII.

FIG. 5 illustrates a heat shield 36' with alternate baffles 43', as shown more clearly in the cross-sectional view of FIG. 7. The heat shield 36' illustrated in FIG. 5 is similar to the heat shield 36, except that the baffles 43' are filleted at a base portion 79. As such, the base portion 79 has an increased thickness relative to the other portions of the baffles 43'. In one embodiment, the filleted base portion 79 can be rounded with a radius of curvature of about 0.010 to 0.050 inches, although other configurations are possible. This arrangement may provide a more secure bond between the baffle 43' and the upstream surface 39 of the heat shield 36', as well as provide an increased surface area relative to the heat shield 36.

Generally, the dimensions of the baffles 43, 43' may vary depending on the dimensions of the heat shield 36, 36', the cooling requirements, the composition of the heat shield 36, 36', the configuration of the engine, and the casting limitations. As best shown in FIG. 2, the height of the baffles 43, 43' can be equal to the distance between the upstream surface 39 of the heat shield 36, 36' and the combustor dome 32. In one embodiment, this height can be about 0.08 inches. This arrangement can provide more control over the air from the impingement openings 44 in the combustor dome 32. Moreover, the baffles 43, 43' can serve to support the heat shield 36, 36' and prevent the heat shield 36, 36' from collapsing on the combustor dome 32. If the heat shield 36, 36' collapses on the combustor dome 32, the heat shield 36, 36' can block the impingement openings 44 and no cooling of the heat shield 36, 36' occurs. An additional benefit of the baffles 43, 43' is an increased effective surface area of upstream surface 39 of the heat shield 36, 36', which increases the effectiveness of the air jets 78 from the impingement openings 44 by increasing the heat transfer from the heat shield 36, 36'. In one exemplary embodiment, the baffles 43, 43' increase the effective surface area of the upstream surface 39 of the heat shield 36, 36' by about 50%.

For baffles 43, 43' manufactured using casting processes casting limitations may require the thickness, or width, of the ribs 46, 47 to be at least about 0.025 inches. A useful thickness of the ribs 46, 47 may be between about 0.020 inches and about 0.050 inches. The thickness of the connection portion 45 may be about equal to the thickness of the ribs 46, 47.

Known casting or machining methods may be used to form the baffles 43, 43' and heat shields 36, 36' of the present invention. The baffles 43, 43' and heat shield 36, 36' may be cast or machined together as one piece. If the casting process is utilized, the heat shields 36, 36' and baffles 43, 43' may be manufactured by utilizing shell-type casting molds. Direct metal laser sintering technology can also be used.

The heat shields 36, 36' and baffles 43, 43' may comprise metal alloys. Useful metal alloys may include nickel based alloys and cobalt based alloys. Preferred metal alloys from which the heat shields 36, 36' and baffles 43, 43' may be cast may include Single Crystal (SC) 180 available from Honeywell and Mar-M247 Eqx Material available from Martin Marietta. Other metal alloys from which the heat shields 36, 36' and baffles 43, 43' may be machined may include HA230 available from Haynes International, MA754 available from Special Metals, and CoCr.

Thermal barrier coatings (TBC) are known in the art and may be applied to the downstream surface 40 of the heat shield 36, 36'. A useful TBC may be Zircoat (by PRAXAIR company) and may be applied by plasma spray technique. These coatings may provide thermal insulation against the hot combustion gases and may reduce the cooling requirement of the heat shield 36, 36'. Any known TBC may be useful in the present invention.

The present invention generally provides gas turbine combustor heat shields and methods for producing the same. The heat shields produced according to the present invention may find beneficial use in many industries including aerospace, automotive, and plant operations. The heat shields of the present invention may be beneficial in applications including electricity generation, naval propulsion, pumping sets for gas and oil transmission, aircraft propulsion, automobile engines, and stationary power plants. This invention may be useful in any gas turbine application. The present invention may be useful with combustors having annular, cylindrical can, and can-annular forms. The present invention may be useful with any gas turbine utilizing axial flow type fuel injectors.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor, comprising: an inner liner; an outer liner circumscribing the inner liner and forming a combustion chamber with the inner liner; a combustor dome coupled to the inner and outer liners; and a plurality of heat shields coupled to combustor dome, each of the heat shields comprising a heat shield plate defined by a first edge facing the inner liner and a second edge facing the outer liner; and a plurality of baffles extending from the heat shield plate, wherein each of the plurality of baffles comprises two parallel ribs and a connection portion connecting the two parallel ribs to form a closed portion and an opposite open portion, the open portion of each of the plurality of baffles facing the first edge or the second edge, and wherein the combustor dome defines a plurality of impingement openings for directing a plurality of cooling jets of cooling air onto each of the plurality of heat shields, and wherein the plurality of baffles direct substantially all of the cooling air to the first and second edges of the heat shield plate, and wherein the combustor has a central axis, wherein the combustor dome defines a plurality of rows of impingement openings for directing a plurality of cooling jets onto each of the plurality of heat shields, the plurality of rows including a first row, a second row, and a third row that are generally aligned with a respective radial of the central axis of the combustor, and wherein the plurality of baffles include a first baffle receiving at least one of the plurality of cooling jets of the first row, and a second baffle adjacent to the first baffle and receiving at least one of the plurality of cooling jets of the third row.

2. The combustor of claim 1, wherein the combustor dome includes a downstream surface facing the combustion chamber, and wherein the plurality of heat shields protects substantially all of the downstream surface of the combustor dome.

3. The combustor of claim 1, wherein the combustor dome includes a downstream surface defining a first area, wherein the upstream surface of the plurality of heat shields defines a second area, and wherein the first area is approximately equal to the second area.

4. The combustor of claim 1, wherein each of the plurality of heat shields is generally trapezoidal.

5. The combustor of claim 1, wherein the annular combustor includes a combustor dome defining a plurality of impingement openings for directing a plurality of cooling jets onto each of the plurality of heat shields, and wherein each of the plurality of baffles is associated with no more than five of the cooling jets.

6. The combustor of claim 1, wherein the annular combustor includes a combustor dome defining a plurality of impingement openings for directing a plurality of cooling jets onto each of the plurality of heat shields, and wherein a first baffle is associated with a first number of the cooling jets and a second baffle is associated with a second number of the cooling jets, the first number being different than the second number.

7. The combustor of claim 6, wherein a third baffle is associated with a third number of the cooling jets, the third number being different than the first and second numbers.

8. The combustor of claim 1, wherein the annular combustor includes a combustor dome defining a plurality of impingement openings for directing a plurality of cooling jets onto each of the plurality of heat shields, and wherein the plurality of baffles prevents a first cooling jet from crossflowing into a second, laterally adjacent cooling jet.

9. The combustor of claim 1, wherein the plurality of baffles extend to the combustor dome.

10. The combustor of claim 1, wherein the combustor dome defines a plurality of aligned rows of impingement openings for directing a plurality of cooling jets onto each of the plurality of heat shields, each row aligned in a radial direction relative to the central axis of the combustor, and wherein two of the plurality of baffles are aligned with one row of the plurality of cooling jets.

11. The combustor of claim 1, wherein the plurality of baffles have a constant thickness.

12. The combustor of claim 1, wherein the heat shield is further defined by two generally straight side edges.

13. The combustor of claim 1, wherein each of the plurality of baffles is generally U-shaped.

14. A heat shield for use in a combustor, comprising: a heat shield plate that is generally trapezoidal and defined by a first edge, a second edge and two side edges: and a plurality of baffles extending from the heat shield plate, wherein each of the plurality of baffles comprises two parallel ribs and a connection portion connecting the two parallel ribs to form a closed portion and an opposite open portion, each of the open portions facing the first or second edge, wherein a first plurality of the plurality of baffles includes the open portion facing the first edge, and a second plurality of the plurality of the baffles includes the open portion facing the second edge.

15. The heat shield of claim 14, wherein each of the plurality of baffles are generally U-shaped.

16. A heat shield to be positioned downstream of a combustor dome in an annular combustor with a central axis, the heat shield comprising:
an upstream surface facing the combustor dome, wherein the upstream surface is defined by an inner edge, an outer edge and two side edges; and
a plurality of baffles extending from the upstream surface, wherein each of the plurality of baffles comprises two parallel ribs and a connection portion connecting the two parallel ribs, wherein each of the plurality of baffles has an open portion opposite the connection portion and facing the inner or outer edge and two side portions that are each aligned with a respective radial of the central axis.

* * * * *